(12) United States Patent
Moshavi et al.

(10) Patent No.: US 9,755,881 B1
(45) Date of Patent: Sep. 5, 2017

(54) RECEIVER WITH DATA-AIDED AUTOMATIC FREQUENCY CONTROL

(71) Applicant: Marvell Israel (M.I.S.L) Ltd., Yokneam (IL)

(72) Inventors: Shimon Moshavi, Bet Shemesh (IL); Ezer Melzer, Tel Avivi (IL); Yona Perets, Ra'anana (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

(21) Appl. No.: 15/173,746

(22) Filed: Jun. 6, 2016

Related U.S. Application Data (60) Provisional application No. 62/197,749, filed on Jul. 28, 2015.

(51) Int. Cl.
*H04L 27/26* (2006.01)
*H04W 72/04* (2009.01)
*H04W 84/04* (2009.01)

(52) U.S. Cl.
CPC ........ *H04L 27/2672* (2013.01); *H04W 72/04* (2013.01); *H04W 84/042* (2013.01)

(58) Field of Classification Search
CPC .. H04L 27/2672; H04W 72/04; H04W 84/042
See application file for complete search history.

(56) References Cited

U.S. PATENT DOCUMENTS

| | | | | |
|---|---|---|---|---|
| 9,306,680 B2* | 4/2016 | Xu | .......................... | H04B 17/21 |
| 2002/0039391 A1* | 4/2002 | Wang | ....................... | H04L 7/042 375/316 |
| 2010/0046404 A1* | 2/2010 | Demir | ................ | H04B 1/70735 370/280 |
| 2011/0158367 A1* | 6/2011 | Banister | .................. | H03J 1/005 375/376 |
| 2013/0176991 A1* | 7/2013 | Yi | ......................... | H04J 11/0076 370/336 |
| 2014/0079164 A1* | 3/2014 | Zhang | ................. | H04L 27/2601 375/343 |
| 2016/0182108 A1* | 6/2016 | Takahashi | ................ | H04B 1/16 455/214 |

OTHER PUBLICATIONS

3GPP TS 36.211, "3rd Generation Partnership Project;Technical Specification Group Radio Access Network; Evolved Universal Terrestrial Radio Access (E-UTRA);Physical channels and modulation, (Release 12)", Version 12.5.0,136 pages, Mar. 2015.

3GPP TR 36.888, "3rd Generation Partnership Project; Technical Specification Group Radio Access Network; Study on provision of low-cost Machine-Type Communications (MTC) User Equipments (UEs) based on LTE (Release 12)", Version 12.0.0, 55 pages, Jun. 2013.

QUALCOMM Incorporated, "PBCH Repetition for MTC", 3GPP TSG RAN WG1 #82, R1-153851, 3 Pages, Beijing, China, Aug. 24-28, 2015.

* cited by examiner

*Primary Examiner* — Freshteh N Aghdam (57) ABSTRACT

A method in a receiver includes receiving from a transmitter a signal including at least first and second frames that carry same data. First and second data symbols are identified in the respective first and second frames, wherein the first symbol has a same data value as the second data symbol. A frequency offset between the transmitter and the receiver is estimated based at least on the identified first and second data symbols. A frequency of the receiver is adjusted based on the estimated frequency offset.

20 Claims, 2 Drawing Sheets

FIG. 3

RECEIVER WITH DATA-AIDED AUTOMATIC FREQUENCY CONTROL

CROSS-REFERENCE TO RELATED APPLICATIONS

This application claims the benefit of U.S. Provisional Patent Application 62/197,749, filed Jul. 28, 2015, whose disclosure is incorporated herein by reference.

FIELD OF THE DISCLOSURE

The present disclosure relates generally to communication systems, and particularly to methods and systems for data-aided automatic frequency control (AFC).

BACKGROUND

In various communication systems a receiver down-converts signals received from a transmitter to baseband. The receiver typically adjusts the down-conversion frequency using automatic frequency control (AFC) techniques. The signal to noise ratio (SNR) of the received signal is a dominant factor affecting the tracking capabilities of the AFC.

A "coverage enhancement" mode has been introduced in Release 13 of the Long Term Evolution (LTE) 3GPP specifications for extending the cell coverage area. A related study on coverage enhancement was earlier reported in 3GPP Technical Specification 36.888, entitled "Technical Specification Group Radio Access Network; Study on provision of low-cost Machine-Type Communications (MTC) User Equipments (UEs) based on LTE," (3GPP TR 36.888, version 12.0.0, Release 12), May, 2013, whose disclosure is incorporated herein by reference.

The description above is presented as a general overview of related art in this field and should not be construed as an admission that any of the information it contains constitutes prior art against the present patent application.

SUMMARY

An embodiment that is described herein provides a method in a receiver, including receiving from a transmitter a signal including at least first and second frames that carry same data. First and second data symbols are identified in the respective first and second frames, wherein the first symbol has a same data value as the second data symbol. A frequency offset between the transmitter and the receiver is estimated based at least on the identified first and second data symbols. A frequency of the receiver is adjusted based on the estimated frequency offset.

In some embodiments, estimating the frequency offset includes identifying in the received signal at least first and second pilot symbols that carry known respective data values, and estimating the frequency offset based on both the first and second data symbols and the first and second pilot symbols. In other embodiments, estimating the frequency offset includes estimating a pilot-based frequency offset based on the first and second pilot symbols, estimating a repeated-data-based frequency offset based on the first and second data symbols, and combining the pilot-based frequency offset and the repeated-data-based frequency offset using a weighted sum. In yet other embodiments, estimating the frequency offset includes resolving ambiguity in the estimated frequency offset based on the estimated frequency offset between the first and second pilot symbols.

In an embodiment, identifying the first and second data symbols includes obtaining the first and second data symbols from corresponding time-frequency resources in the first and second frames. In another embodiment, the first and second data symbols are scrambled in the transmitter with respective different scrambling sequences, the first and second data symbols have the same data value, receiving the signal includes receiving respective post-scrambling versions of the first and second data symbols, and estimating the frequency offset includes estimating the frequency offset based on the post-scrambling versions of the first and second data symbols.

In some embodiments, estimating the frequency offset is performed without re-scrambling or de-scrambling any of the first and second frames. In other embodiments, estimating the frequency offset includes multiplying a post-scrambling version of the first data symbol by a complex conjugate of the post-scrambling version of the second data symbol to produce a complex-valued metric, and including the complex-valued metric in estimation of the frequency offset if the complex-valued metric satisfies a predefined criterion. In yet other embodiments, estimating the frequency offset includes evaluating a distance measure between scrambling values that were used for scrambling the data value of the first and second data symbols, and including the complex-valued metric in the estimation of the frequency offset if the evaluated distance has a predefined value.

In an embodiment, identifying the first and second data symbols includes detecting data values of corresponding data symbols in a previously received sub-frame, and assigning the detected data values to the first and second symbols with no explicit detection. In another embodiment, receiving the signal includes receiving a downlink signal or an uplink signal in accordance with a Long-Term Evolution (LTE) specification.

There is additionally provided, in accordance with an embodiment that is described herein, a receiver including a front end and a processor. The front end is configured to receive from a transmitter a signal including at least first and second frames that carry same data. The processor is configured to identify in the first and second frames respective first and second data symbols, wherein the second data symbol has a same data value as the first data symbol, to estimate a frequency offset between the transmitter and the receiver based on the identified first and second data symbols, and to adjust a frequency of the receiver based at least on the estimated frequency offset.

In some embodiments, a wireless communication terminal includes the disclosed receiver. In some embodiments, a chipset for processing signals in a wireless communication terminal includes the disclosed receiver. In some embodiments, a chipset for processing signals in a base station includes the disclosed receiver.

The present disclosure will be more fully understood from the following detailed description of the embodiments thereof, taken together with the drawings in which:

DETAILED DESCRIPTION OF EMBODIMENTS

In various communication systems the receiver tracks the instantaneous frequency of the transmitter using automatic frequency control (AFC). Typically, the AFC is designed to operate at or above some minimal signal to noise ratio (SNR) level of the received signal. A feature introduced in Release 13 of the LTE 3GPP specifications, referred to as a "coverage enhanced mode," enables the receiver to operate at particularly low SNR levels, e.g., −14 dB or lower. Operation at low SNR, however, may degrade the performance of conventional AFC.

Embodiments that are described herein provide improved methods and systems for AFC for increased performance at low SNR. The disclosed techniques take advantage of transmission modes, such as the LTE coverage enhancement mode, in which the same user data is duplicated in different frames. Some of the disclosed techniques are able to use such duplicate data even though the different frames are scrambled with different scrambling sequences.

In the description that follows, we refer mainly to a LTE communication system and to a wireless terminal, also referred to as a User Equipment (UE) in LTE, which receives downlink transmission from a base station (BS) in the system. The disclosed techniques are equally applicable, however, to other suitable types of communication systems in which frequency error can be estimated from data that is duplicated over multiple transmissions, and/or to uplink transmissions from the UE to the BS.

In some embodiments, a receiver generates a local oscillator (LO) signal having some nominal frequency for down-converting the received signal to baseband. The AFC uses the baseband signal to estimate a frequency offset for adjusting the nominal frequency. The baseband signal typically carries user data symbols that are unknown at the receiver, and reference or pilot symbols that are known in advance to the receiver.

Embodiments that are described herein provide improved methods and systems for AFC using data symbols of multiple sub-frames that carry the same data, and possibly also using known pilot symbols. The sub-frames carrying same data are also referred to as "repeated sub-frames" or "duplicated sub-frames." Repeated sub-frames are transmitted, for example, in the LTE enhanced coverage mode. By using the disclosed techniques, a processor in the receiver is able to estimate the frequency offset between the transmitter and the receiver based on data symbols, even though the data they convey is not known in advance. Since the received signal comprises a considerably higher number of data symbols than reference symbols, the disclosed AFC schemes outperform possible naïve schemes that are based only on reference symbols having known values.

In some embodiments, the processor evaluates, based on the known values of the pilot symbols, a complex-valued metric M(T) that is indicative of the frequency offset. In some embodiments, M(T) is evaluated by calculating a correlation-like metric for each of multiple pairs of pilot symbols that are at interval T apart from one another, and by accumulating the correlation-like outcomes over multiple symbol pairs. Note that the estimation technique described above relies on known values of the received symbols and is therefore unsuitable for the data symbols of the repeated sub-frames, which are generally unknown.

In some embodiments, the processor uses data symbols in the repeated sub-frames for estimating the frequency offset even though their values are unknown, by exploiting the data duplication. In these embodiments, the processor evaluates a complex-valued metric M(T0) that accumulates multiple correlation metrics calculated over multiple respective data symbols pairs. The data symbols in each pair are selected from adjacent repeated sub-frames that are at interval T0 apart from one another, and correspond to same data values that were mapped to symbols in the transmitter. Typically, the number of data symbols for evaluating M(T0) is much larger than the number of pilot symbols available for evaluating M(T) and therefore the estimation based on the repeated sub-frames is much more reliable.

In some embodiments, the baseband signal comprises an orthogonal frequency-division multiple access (OFDMA) signal. In this case, symbols paired for evaluating M(T) or M(T0) correspond to the same sub-carrier of the OFDM signal.

The value of the estimated frequency offset may be ambiguous when the time interval between the paired symbols is long. In some embodiments, since the reference symbols are paired at interval T within the sub-frames and the data symbols are paired at interval T0 from different sub-frames, interval T0 is longer than T. In an embodiment, possible phase or frequency ambiguity in the frequency offset estimated based on the repeated sub-frames is resolved using the frequency offset estimated based on the reference symbols. In some embodiments, the ambiguity-resolved frequency offset is combined with the frequency offset estimated based on the reference symbols, e.g., using a suitable weighted sum.

In some embodiments, prior to mapping to symbols at the transmitter, the data in the repeated sub-frames is scrambled using sub-frame specific scrambling sequences. As a result, data symbols in the repeated sub-frames corresponding to same data values prior to scrambling will typically have different values. In such embodiments, the processor selects correlation outcomes to be included in calculating M(T0) using a suitable selection criterion, which is based on the known scrambling sequences. Note that applying the selection criterion does not require re-scrambling or de-scrambling of the repeated sub-frames.

Example embodiments described below demonstrate selection criteria for a quadrature phase-shift keying (QPSK) modulation and 16-quadrature amplitude modulation (QAM) schemes. For example, in 16-QAM, a four-bit value is determined based on the scrambling bits used for each of the paired data symbols, and the respective correlation metric is included in evaluating M(T0) only when the four-bit value equals one of multiple predefined values. The estimation reliability of this technique is equivalent to the reliability of evaluating M(T0) that would result by using about half the data symbol pairs for which no scrambling is applied.

Figure 1:
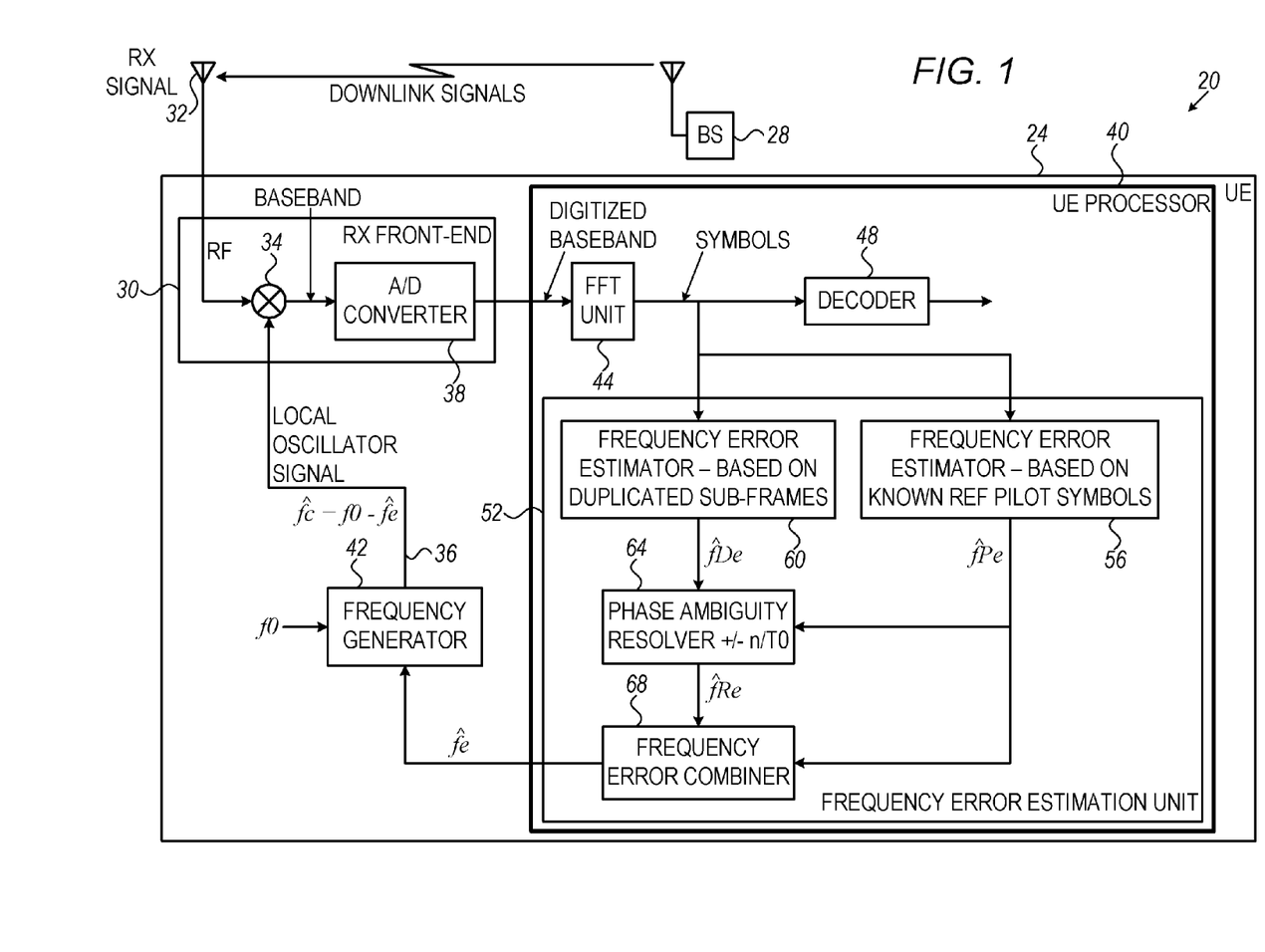
FIG. 1 is a block diagram that schematically illustrates a wireless communication terminal operating in a wireless LTE communication network, in accordance with an embodiment that is described herein.

FIG. 1 is a block diagram that schematically illustrates a wireless communication terminal 24 operating in a wireless LTE communication network 20, in accordance with an embodiment that is described herein. In LTE and LTE-A terminology, terminal 24 is also referred to as UE, and the two terms are used interchangeably herein. In various embodiments, UE 24 comprises, for example, a mobile phone, a wireless-enabled computing device, an Internet-of- Things (IoT) or Machine-Type Communication (MTC) communication device, or any other suitable type of wireless terminal.

The receiver section of terminal 24 comprises one or more receive antennas 32 for receiving downlink signals from a Base Station (BS) 28. Depending on the applicable standard, BS 28 is also referred to as a cell, NodeB or eNodeB. Among other tasks, the UE receives from the BS downlink signals, which comprise reference signals, optionally data-carrying signals, and possibly additional signals as well. The reference signals carry pilot symbols that are known in advance to the receiver and are used, for example, for synchronization of the UE to the base station, for automatic frequency control (AFC), and for performing channel measurements by the UE. The data-carrying signals carry user data symbols that are typically unknown at the receiver. When operating in the 3GPP LTE coverage enhancement mode the data-carrying signals contain special sub-frames whose data is duplicated over multiple sub-frames.

Although in the configuration of FIG. 1, the elements of UE 24 are mainly described with respect to LTE, similar configurations are also applicable to terminals that operate in other suitable networks, such as, for example, LTE-A and wideband code division multiple access (W-CDMA) networks.

A Receiver Front End (RX FE) 30 comprises a down-converter 34 and an analog to digital (A/D) converter 38. Down-converter 34 down-converts Radio Frequency (RF) signals received by antenna 32 to baseband by multiplying the RF signals by a local oscillator (LO) signal 36 generated by a frequency generator 42. A/D converter 38 typically accepts a filtered version of the baseband signal output from down-converter 34 and outputs a respective digitized version of the baseband signal. FE 30 typically applies additional functions such as, for example, amplification and gain control.

In LTE, downlink transmission employs an orthogonal frequency-division multiple access (OFDMA) transmission scheme, which is a multicarrier technology subdividing the available bandwidth into multiple narrowband subcarriers that are mutually orthogonal. Each OFDM subcarrier is modulated using conventional modulation schemes such as quadrature phase-shift keying (QPSK) and 16-quadrature amplitude modulation (QAM) schemes, at a suitable symbol rate.

The LTE transmission scheme is described, for example, in 3GPP Technical Specification TS 36.211 entitled "3rd Generation Partnership Project; Technical Specification Group Radio Access Network; Evolved Universal Terrestrial Radio Access (E-UTRA); Physical channels and modulation (Release 12)," (3GPP TS 36.211), version 12.2.0, June, 2014, whose disclosure is incorporated herein by reference.

In FIG. 1, the baseband signal output by the A/D converter comprises an OFDM signal that can be represented by a grid comprising multiple time-frequency bins, also referred to as time-frequency resources. In LTE, the time-frequency bins correspond to respective resource elements (REs). The baseband signal is provided to a UE processor 40, which comprises, in the present example, a fast Fourier transform (FFT) unit 44, a decoder 48 and a frequency estimation unit 52. FFT unit 44 recovers from the OFDM signal multiple complex-valued symbols that were used in the transmitter to modulate the subcarriers in accordance with respective modulation schemes.

The symbols at baseband can be described mathematically as follows:

$$Q_k = \alpha_k \cdot S_k \cdot S_k \cdot e^{j2\pi f_e t_k} + \eta_k \qquad \text{Equation 1:}$$

In Equation 1, k is a time index, $\alpha_k$ is a complex-valued factor representing the channel effect on the received signal, $S_k$ is a complex-valued symbol and $n_k$ is a noise sample. In addition, $t_k$ denotes the $k^{th}$ sampling instance, and $f_e$ denotes the frequency error (or offset), i.e., the deviation between the local down conversion frequency f0 and the frequency $f_C$ used at the transmitter side. In the present example, the baseband signal comprises an OFDM signal, and for the symbols at the output of the FFT unit, the index k in Equation 1 is replaced by a pair of indices (k,l) for indexing resource elements in both time (k) and frequency (l). In this case, symbols that are paired as will be described below belong to the same sub-carrier of the OFDM. For the sake of clarity, the description that follows refers mainly to the time indexing of the symbols, but is applicable to OFDM signals as well.

The symbols at the FFT unit output are provided to decoder 48, which maps the symbols to soft bits and decodes the transmitted information. The FFT output is additionally provided to frequency error estimation unit 52, which estimates a frequency error denoted $\hat{f}e$. The AFC loop is closed by frequency generator adjusting the down-conversion frequency f0 based on the estimated frequency error as given in Equation 2 below, and providing the adjusted frequency fc to down-converter 34.

$$\hat{f}c = f0 - \hat{f}e \qquad \text{Equation 2:}$$

Frequency error estimation unit 52 comprises two separate frequency error estimators, i.e., estimator 56, which is based on known reference pilot symbols, and estimator 60, which is based on the symbols in the duplicated sub-frames.

As will be described in detail below, estimating the frequency error involves calculating a complex-valued metric using symbol pairs, and applying to the metric a trigonometric operation, which may result in ambiguous estimation of the frequency error. A phase ambiguity resolver 64 uses non-ambiguous frequency estimation $\hat{f}Pe$ of estimator 56 to resolve possible ambiguity in a frequency estimation $\hat{f}De$ of estimator 60. A frequency error combiner 68 combines the frequency error $\hat{f}Pe$ and an ambiguity-resolved frequency error $\hat{f}Re$ to produce the final frequency error estimation $\hat{f}e$.

In some embodiments, some or all of the elements of UE 24 such as FE 30, FFT unit 44 and/or decoder 48 are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain UE elements, such as frequency error estimation unit 52, decoder 48 and/or FFT unit 44 are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, the entire AFC operation is digital. In such embodiments, the estimated frequency offset is used to adjust the frequency at baseband, e.g., at the input to FFT unit 44 or to decoder 48. In alternative embodiments, the AFC loop is closed in both analog and digital domains. For example, the estimated frequency offset uses for coarse adjustment analogically by down-converter 34, and final fine adjustment is carried out digitally as described above.

The UE configuration seen in FIG. 1 is a simplified example configuration, which is depicted in this simplified presentation solely for the sake of clarity. In alternative embodiments, any other suitable UE configuration can be used. UE elements that are not mandatory for understanding of the disclosed techniques have been omitted from the figure for the sake of clarity.

Figure 2:
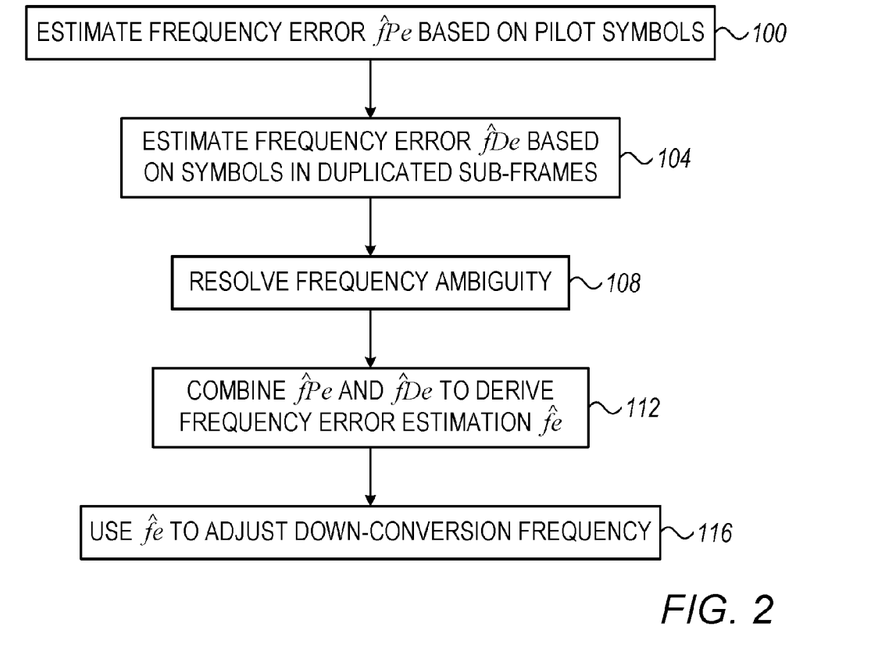
FIG. 2 is a flow chart that schematically illustrates a method for automatic frequency control (AFC), in accordance with an embodiment that is described herein.

FIG. 2 is a flow chart that schematically illustrates a method for automatic frequency control (AFC), in accordance with an embodiment that is described herein. The method begins with estimator 56 estimating frequency error fPe using pilot symbols that are known at the receiver, at a pilot-based estimation operation 100, as detailed herein. Let $Z_n$ denote a pilot symbol having a known value $P_n$ corresponding to sampling instance $t_n$:

$$Z_n = \alpha_n P_n e^{j2\pi f_e t_k} + \eta_n \quad \text{Equation 3}$$

Estimator 56 pairs consecutive pilot symbols that are at interval $T = t_{n+1} - t_n$ apart from one another, and calculates a metric M(T) as:

$$M(T) = \sum_n Z_n^* Z_{n+1} P_n P_{n+1}^* \quad \text{Equation 4}$$

By evaluating Equation 4 using the expression in Equation 3, and assuming that the noise samples are sufficiently small to be neglected, M(T) can be approximated as:

$$M(T) = \left( \sum_n |\alpha_n|^2 |P_n|^2 |P_{n+1}|^2 \right) \cdot e^{j2\pi f_e T} \quad \text{Equation 5}$$

Estimator 56 uses the real and imaginary parts of M(T) to derive fPe as follows:

$$\hat{f}Pe = \frac{1}{2\pi T} \arctan\left\{ \frac{\text{Im}[M(T)]}{\text{Re}[M(T)]} \right\} \quad \text{Equation 6}$$

The output of the arctan function, is ambiguous modulo $2\pi$ and therefore the estimated frequency error is ambiguous in multiplies of $\pm(\frac{1}{2}T)$. In an LTE system, e.g., in which the cyclic prefix (CP) is configured to "normal," the pilot symbols occupy the OFDM symbols 0, 4, 7, and 11. Since the time interval between symbol pairs (4,7) is about T=214 micro-seconds, a frequency error up to about 1/(2T)=±2.33 KHz can be estimated, by paring symbols 4 and 7, with no ambiguity. When using pilot symbol pairs (0,4) and (7,11), the time interval is T=285.7 micro-seconds, and a frequency error up to about ±1.75 KHz can be tolerated with no ambiguity.

At a duplicated sub-frame based estimation operation 104, estimator 60 uses symbols contained in the duplicated sub-frames for estimating fPe. In this case, the sampled symbols $Q_k$ are provided by Equation 1 above, wherein the values of the transmitted symbols $S_k$ are unknown. Let T0 denoted the interval between paired symbols, i.e., T0=$t_{k+1}$ − $t_k$. A metric M(T0) is defined as:

$$M(T0) = \sum_k Q_k Q_{k+1}^* = \left( \sum_n |\alpha_k|^2 |S_k|^2 \right) e^{j2\pi f_e T0} \quad \text{Equation 7}$$

Note that although the values of the symbols $S_k$ are unknown, the symbols in Equation 7 are paired such that $S_k = S_{k+l}$, i.e., taking symbols of the same value in consecutive duplicated sub-frames. Moreover, assuming a slowly varying channel, $\alpha_k$ approximately equals $\alpha_{k+1}$ and therefore $\alpha_k^* \alpha_{k+1}$ is approximated by the expression $|\alpha_k|^2$. The estimated frequency error is calculated by estimator 60 as:

$$\hat{f}De = \frac{1}{2\pi T} \arctan\left\{ \frac{\text{Im}[M(T0)]}{\text{Re}[M(T0)]} \right\} \quad \text{Equation 8}$$

The calculation of M(T0) in Equation 7 typically includes a number of symbol pairs that is significantly larger than the number of pilot symbol pairs used for calculating M(T) in Equation 5. The reason for this is that there are typically only a few pilot symbols in the sub-frames available for estimating M(T), whereas all or most of the symbols in the duplicated sub-frames are available for estimating M(T0). As a result, the estimation of M(T0) is typically much more reliable than the estimation of M(T).

Note that the sub-frame interval in LTE is 1 milliseconds, and therefore the frequency error can be estimated up to about ±500 Hz with no ambiguity. At an ambiguity resolving operation 108, ambiguity resolver 64 uses the frequency error estimation of estimator 56 to resolve possible ambiguity in the estimated frequency error of estimator 60. The two frequency estimates are related by:

$$\hat{f}De + \frac{N0}{T0} \approx \hat{f}Pe \quad \text{Equation 9}$$

In an embodiment, ambiguity resolver 64 uses Equation 9 to find the correct value of N0 and outputs a resolved frequency error as follows:

$$\hat{f}Re = \hat{f}De + \frac{N0}{T0} \quad \text{Equation 10}$$

At a combining operation 112, frequency error combiner 68 combines the frequency error estimates from estimators 56 and 60 to derive fe. In some embodiments, combiner 68 combines the two frequency error estimates using a weighted sum as given by:

$$\hat{f}e = WR \cdot \hat{f}Re + WP \cdot \hat{f}Pe, WP + WR = 1 \quad \text{Equation 11:}$$

In Equation 11, WP denotes the weight assigned to the pilot-based estimation, and WR denotes the weight assigned to the (ambiguity-resolved) duplicated sub-frame based estimation. In one embodiment, the combiner determines WP and WR based on SNRs corresponding to the respective estimated metric M(T) and M(T0). In another embodiment, the combiner determines WP and WR based on the relative number of symbol pairs used in calculating M(T) or M(T0), respectively.

At a frequency adjustment operation 116, the receiver uses fe to adjust the down-conversion frequency as given by Equation 2 above, and the method terminates.

In the embodiments described above, the repeated sub-frames carry unscrambled data and therefore the respective paired symbols have the same values. In some embodiments, in the transmitter, the data in each sub-frame is scrambled using a pseudo-random sequence prior to mapping the data to symbols. As a result, the symbols corresponding to same data values prior to scrambling typically have different values when modulated based on the scrambled data.

Consider, for example, a quadrature phase-shift keying (QPSK) modulation scheme that maps bit-pairs to complex-valued symbols of the form $S=(S_I+jS_Q)/\sqrt{2}$, wherein $S_I$ and $S_Q$ denote the real and imaginary parts of the symbol S, respectively. Table 1 below depicts a QPSK mapping table.

TABLE 1

Symbol mapping in QPSK modulation

| Bit-pair ($b_I$, $b_Q$) | ($S_I$, $S_Q$) |
|---|---|
| 00 | (1, 1) |
| 01 | (1, −1) |
| 10 | (−1, 1) |
| 11 | (−1, −1) |

As seen in Table 1, in accordance with this modulation scheme, the bits can be mapped independently using the relationship:

$$S_I = 1 - 2b_I$$

$$S_Q = 1 - 2b_Q \quad \text{Equation 12:}$$

If the bits $b_I$ and $b_Q$ are scrambled, i.e., flipped in accordance with respective scrambling bits, SI and SQ are multiplied by respective scrambling values $A_I, A_Q$ whose values are '1' or '−1'. Mapping the scrambled bits results in a symbol S of the form:

$$S = (d_I A_I - j d_Q A_Q)/\sqrt{2} \quad \text{Equation 13:}$$

wherein $$d_I = 1 - 2b_I$$

$$d_Q = 1 - 2b_Q \quad \text{Equation 14:}$$

Note that each of $d_I$ and $d_Q$ corresponds to an un-scrambled respective bit bI or bQ, and therefore has the same values in the duplicated sub-frames. Now we provide an expression of the correlation between the symbols $S1 = d_I A_{I1} + j d_Q A_{Q1}$ and $S2 = d_I A_{I2} + j d_Q A_{Q2}$:

$$S_1 S_2^* = (A_{I1}A_{I2} + A_{Q1}A_{Q2})/2 + j d_I d_Q (A_{Q1}A_{I2} - A_{I1}A_{Q2})/2 \quad \text{Equation 15:}$$

$S_1 S_2^*$ in Equation 15 depends on the scrambling values as depicted in Table 2:

TABLE 2

Symbol-pair correlation for different scrambling values

| $A_{I1}A_{I2}$ | $A_{Q1}A_{Q2}$ | $S_1 S_2^*$ |
|---|---|---|
| 1 | 1 | 1 |
| −1 | −1 | −1 |
| 1 | −1 | Depends on $d_I$, $d_Q$ |
| −1 | 1 | Depends on $d_I$, $d_Q$ |

Based on this analysis, we can derive a criterion for determining which of the $Q_k Q_{k+1}^*$ correlation metrics in Equation 7 should be included in calculating M(T0). Assuming that the scrambling values $(A_{I1}, A_{Q1})$ and $(A_{I2}, A_{Q2})$ correspond to Qk and Qk+1, respectively, it is possible to calculate $A_{I1}A_{I2}$ and $A_{Q1}A_{Q2}$ and decide whether to include the correlation metric in accordance with the selection criterion in Table 3 below. Note that subtracting the correlation metric $Q_k Q_{k+1}^*$ in the last row of Table 3 is equivalent to adding the absolute value of this correlation metric.

TABLE 3

Selection criterion

| Condition | Usage of $O_k O_{k+1}^*$ in calculating M(T0) |
|---|---|
| $A_{I1}A_{I2} = A_{Q1}A_{Q2}$ | Ignore |
| $A_{I1}A_{I2} = A_{Q1}A_{Q2} = 1$ | Add $Q_k Q_{k+1}^*$ |
| $A_{I1}A_{I2} = A_{Q1}A_{Q2} = -1$ | Subtract $Q_k Q_{k+1}^*$ |

Since the scrambling sequences are random (or pseudo random), the scrambling values $A_{I1}, A_{I2}, A_{Q1}$ and $A_{Q2}$ get ±1 values with similar probabilities, and therefore about half of the symbols in the sub-frames can be used for evaluating M(T0) using Equation 7.

Figure 3:
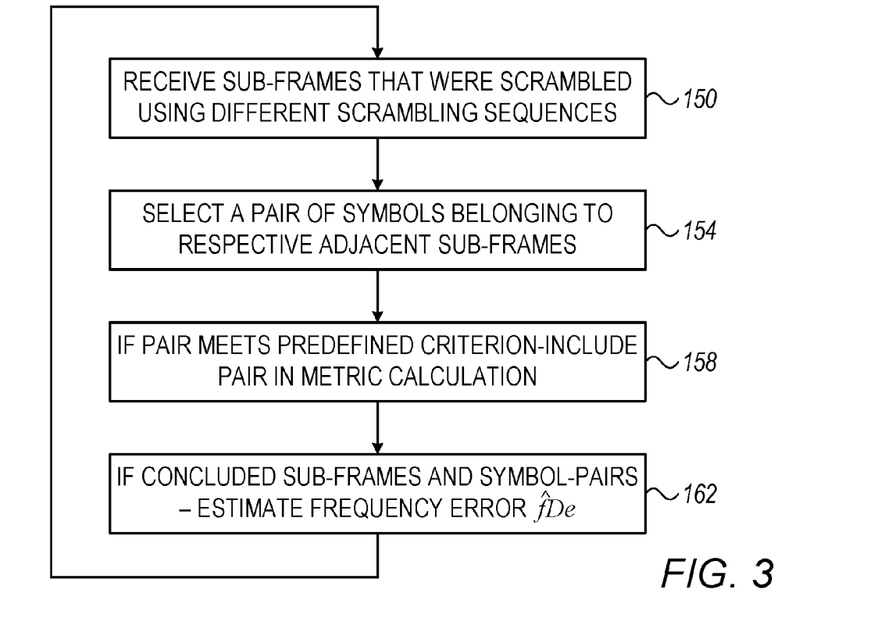
FIG. 3 is a flow chart that schematically illustrates a method for AFC using duplicated sub-frames carrying scrambled data, in accordance with an embodiment that is described herein.

FIG. 3 is a flow chart that schematically illustrates a method for AFC using duplicated sub-frames carrying scrambled data, in accordance with an embodiment that is described herein. At a reception operation 150, estimator 60 receives multiple repeated sub-frames that carry duplicated data scrambled using different sub-frame specific scrambling sequences. At a selection operation 154 estimator 60 selects a pair of symbols $Q_k$ and $Q_{k+1}$ that belong to adjacent repeated sub-frames. At a criterion evaluation operation 158, estimator 60 applies a suitable selection criterion, and includes $Q_k Q_{k+1}^*$ in calculating M(T0), accordingly. In some embodiments, the underlying modulation scheme is QPSK and estimator 60 applies the selection criterion defined in Table 3. At a frequency error estimation operation 162, estimator 60 checks whether all or a sufficiently large number of the sub-frames and symbol pairs have been processed, and if so, estimator 60 evaluates the frequency error based on M(T0) using Equation 8. Otherwise, the method loops back to operation 150 to receive and process subsequent repeated sub-frames.

Next we describe another example of a selection criterion that can be used at operation 158 of the method in FIG. 3, for a 16-QAM modulation scheme. Table 4 below depicts mapping groups of four bits to complex-valued symbols of the form $S=(S_I+jS_Q)/\sqrt{10}$ in accordance with a 16-QAM modulation scheme.

TABLE 4

16-QAM scheme

| Index | Four-bit group | $(S_I, S_Q) \cdot \sqrt{10}$ |
|---|---|---|
| 1 | 0000 | (1, 1) |
| 2 | 0001 | (1, 3) |
| 3 | 0010 | (3, 1) |
| 4 | 0011 | (3, 3) |
| 5 | 0100 | (1, −1) |
| 6 | 0101 | (1, −3) |
| 7 | 0110 | (3, −1) |
| 8 | 0111 | (3, −3) |
| 9 | 1000 | (−1, 1) |
| 10 | 1001 | (−1, 3) |
| 11 | 1010 | (−3, 1) |
| 12 | 1011 | (−3, 3) |
| 13 | 1100 | (−1, −1) |
| 14 | 1101 | (−1, −3) |
| 15 | 1110 | (−3, −1) |
| 16 | 1111 | (−3, −3) |

Let the function $S=f(d_1,d_2,d_3,d_4)$ denote the mapping in Table 4, wherein each input bit $b_i$ ($1 \leq i \leq 4$) is replaced by $d_i = 1 - 2b_i$, i.e., f(•) accepts inputs having values ±1. Let S1 and S2 denote paired symbols in sub-frames k and k+1, respectively. Since the data is duplicated, $d_i$ has the same value in all the repeated sub-frames. Let $A_{I1}$ and $A_{I2}$ having values±1 denote the scrambling values used for scrambling the $i^{th}$ bit in the 4-tuple mapped to S1 and S2, respectively. The scrambled bits are denoted $D_{i1}=d_iA_{i1}$ and $D_{i2}=d_iA_{i2}$ (i= 1 . . . 4), respectively. Using the above notation, S1 and S2 are given by:

$$S_1=f(d_1A_{11},d_2A_{21},d_3A_{31},d_4A_{41})=f(D_{11},D_{21},D_{31},D_{41})$$

$$S_2=f(d_1A_{12},d_2A_{22},d_3A_{32},d_4A_{42})=f(D_{12},D_{22},D_{32},D_{42}) \quad \text{Equation 16:}$$

By defining $q_i=A_{i2}/A_{i1}=A_{i2}A_{i1}$, we have $D_{i2}=q_iD_{i1}$ and Equation 16 can be expressed as:

$$S_1=f(D_{11},D_{21},D_{31},D_{41})$$

$$S_2=f(q_1D_{11},q_2D_{21},q_3D_{31},q_4D_{41}) \quad \text{Equation 17:}$$

As seen in Equation 17, for a given S1, S2 can have sixteen different values depending on the quadruplet $q=(q_1, q_2,q_3,q_4)$, wherein $q_i=D_{i2}D_{i1}$. For example, when $q_i=1$ for i=1 . . . 4, we get S1=S2. Therefore, in this case $Q_kQ_{k+1}^*$ has a real positive value and should be added in M(T0) independently of the 4-bit data and the scrambling sequences. As another example, when q=(q1,q2,q3,q4)=(−1,−1,1,1), we get S1=−S2. In this case $Q_kQ_{k+1}^*$ has a real negative value and should be subtracted in calculating M(T0) independently of the 4-bit data and the scrambling sequences. Including the correlation $Q_kQ_{k+1}^*$ for the above two out of sixteen cases represents a usage of 12.5% of the symbols in the data-scrambled sub-frames.

For other combinations of q=(q1,q2,q3,q4), the real and imaginary components of the correlation metric may have different polarities for different combinations of $(D_{11},D_{21},D_{31},D_{41})$. Table 5 below depicts the correlation metric values averaged separately over the sixteen combinations of $(D_{11},D_{21},D_{31},D_{41})$ for each combination of (q1,q2,q3,q4). Note that in Table 5, $q_i$=−1/1 is mapped respectively to 0/1, i.e., (−1,−1,1,1) is mapped in the table to (0011).

TABLE 5

Averaged correlation metrics

| q = 0000 | q = 0001 | q = 0010 | q = 0011 | q = 0100 | q = 0101 | q = 0110 | q = 0111 |
|---|---|---|---|---|---|---|---|
| −0.6 | −0.8 | −0.8 | −1.0 | 0.0 | 0.2 | −0.2 | 0.0 |

| q = 1000 | q = 1001 | q = 1010 | q = 1011 | q = 1100 | q = 1101 | q = 1110 | q = 1111 |
|---|---|---|---|---|---|---|---|
| 0.0 | −0.2 | 0.2 | 0.0 | 0.6 | 0.8 | 0.8 | 1.0 |

As seen in Table 5, the averaged correlation metric is a real value for each of the sixteen q-quadruples. Moreover, for some of the q-quadruples, the correlation value has higher statistical significance, i.e., has a higher absolute value. For example, q=0011 and q=111 yield the highest absolute correlation value 1.0 and −1.0, respectively. For q=1101 and q=1110 the correlation is 0.8 and for q=0001 and q=0010 the correlation is −0.8, which when included in M(T0) is equivalent to using 80% of the available symbol pairs if the data in the sub-frames has not been scrambled. A similar argument applies to q=1100 and q=0000 for which the average correlation is 0.6 and −0.6, respectively. A method for calculating M(T0) by applying a selection criterion for the correlation values is given herein:

Determine the q-quadruple for each pair (S1, S2). In some embodiments, the q-quadruple is determined based on the scrambling sequences by calculating $q_i=A_{i2}A_{i1}$.

The q-quadruple (q1,q2,q3,q4) can be viewed as a distance measure between the scrambling values ($A_{11}, A_{21},A_{31},A_{41}$) and ($A_{12},A_{22},A_{32},A_{42}$).

Estimator 60 then applies the following selection criterion:

If the q-quadruple equals one of {0101, 1010, 1100, 1101, 1110, 1111} then add the correlation metric of the repeated symbol pair in calculating M(T0).

If the q-quadruple equals one of {0000, 0001, 0010, 0011, 0110, 1001} then subtract the correlation metric of the repeated symbol pair in calculating M(T0).

If none of the two conditions is met, exclude the repeated symbol pair from the calculation of M(T0).

In the method described above quadruples corresponding to correlation values 0.2 and −0.2 were included under the assumption of averaging over a sufficiently large number of symbol pairs. In other embodiments, when the number of symbol pairs available for calculating M(T0) is too small for achieving a reliable estimation, these correlation values are excluded.

Note that the average absolute bias over all 16 q-quadruple combinations is 0.45. Therefore, assuming there is a sufficiently large number of data symbol pairs to average over, the estimation reliability of this technique is approximately equivalent to the reliability of evaluating M(T0) that would result by using 45% of the data symbol pairs for which no scrambling is applied.

In some embodiments, decoder 48 processes a sub-frame to successfully detect the frame symbols, e.g., using Cyclic Redundancy Check (CRC) techniques, regardless of receiving other repeated sub-frames. This approach is also referred to herein as an "early detection" approach. In such embodiments, the symbol values input to estimator 60 are known, and the estimator can calculate M(T0) similarly to calculating M(T) using known pilot symbols in Equation 4.

In addition, since the detected symbols can be paired within the sub-frame, the time interval could be smaller than the time interval used when the paired symbols belong to different sub-frames, and therefore the estimation of the frequency error tolerates higher deviation values without causing ambiguity.

The early detection approach can also be used when the repeated sub-frames are not identical. For example, in an embodiment, this approach is applicable when using incremental redundancy, i.e., when the repeated sub-frames carry the same bits, which are encoded using different respective redundancy versions (RV numbers).

The embodiments described above are given by way of example, and alternative embodiments can also be used. For example, although the description above refers mainly to QPSK and 16-QAM schemes, the embodiments described can be adapted to use QAM mappings other than described above, and for other suitable modulation schemes as well.

In the embodiments described above, the frequency estimate that is based on the pilot symbols is combined with the frequency estimate that is based on the repeated sub-frames. This configuration is not mandatory, and in other embodiments, only the frequency estimate that is based on the repeated sub-frames can be used.

The disclosed techniques may be used in various applications and systems. In one embodiment, a receiver in a wireless communication terminal comprises a chipset for processing signals to implement some or all of the disclosed embodiments. In another embodiment, a receiver in a base station of a communication system comprises a chipset for processing signals to implement some or all of the disclosed embodiments.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a receiver, receiving from a transmitter a signal comprising at least first and second frames that carry same data;
identifying in the first and second frames respective first and second data symbols, wherein the first symbol has a same data value as the second data symbol;
estimating a frequency offset between the transmitter and the receiver based at least on the identified first and second data symbols; and
adjusting a frequency of the receiver based on the estimated frequency offset.

2. The method according to claim 1, wherein estimating the frequency offset comprises identifying in the received signal at least first and second pilot symbols that carry known respective data values, and estimating the frequency offset based on both the first and second data symbols and the first and second pilot symbols.

3. The method according to claim 2, wherein estimating the frequency offset comprises estimating a pilot-based frequency offset based on the first and second pilot symbols, estimating a repeated-data-based frequency offset based on the first and second data symbols, and combining the pilot-based frequency offset and the repeated-data-based frequency offset using a weighted sum.

4. The method according to claim 2, wherein estimating the frequency offset comprises resolving ambiguity in the estimated frequency offset based on the estimated frequency offset between the first and second pilot symbols.

5. The method according to claim 1, wherein identifying the first and second data symbols comprises obtaining the first and second data symbols from corresponding time-frequency resources in the first and second frames.

6. The method according to claim 1, wherein the first and second data symbols are scrambled in the transmitter with respective different scrambling sequences, wherein the first and second data symbols have the same data value, wherein receiving the signal comprises receiving respective post-scrambling versions of the first and second data symbols, and wherein estimating the frequency offset comprises estimating the frequency offset based on the post-scrambling versions of the first and second data symbols.

7. The method according to claim 6, wherein estimating the frequency offset is performed without re-scrambling or de-scrambling any of the first and second frames.

8. The method according to claim 6, wherein estimating the frequency offset comprises multiplying a post-scrambling version of the first data symbol by a complex conjugate of the post-scrambling version of the second data symbol to produce a complex-valued metric, and including the complex-valued metric in estimation of the frequency offset if the complex-valued metric satisfies a predefined criterion.

9. The method according to claim 8, wherein estimating the frequency offset comprises evaluating a distance measure between scrambling values that were used for scrambling the data value of the first and second data symbols, and including the complex-valued metric in the estimation of the frequency offset if the evaluated distance has a predefined value.

10. The method according to claim 1, wherein identifying the first and second data symbols comprises detecting data values of corresponding data symbols in a previously received sub-frame, and assigning the detected data values to the first and second symbols with no explicit detection.

11. The method according to claim 1, wherein receiving the signal comprises receiving a downlink signal or an uplink signal in accordance with a Long-Term Evolution (LTE) specification.

12. A receiver, comprising:
a front end, which is configured to receive from a transmitter a signal comprising at least first and second frames that carry same data; and
a processor, which is configured to identify in the first and second frames respective first and second data symbols, wherein the second data symbol has a same data value as the first data symbol, to estimate a frequency offset between the transmitter and the receiver based on the identified first and second data symbols, and to adjust a frequency of the receiver based at least on the estimated frequency offset.

13. The receiver according to claim 12, wherein the processor comprises a fast Fourier transform (FFT) unit, a decoder and a frequency estimation unit, wherein the FFT unit is configured to receive a baseband signal and to recover the data symbols from the baseband signal, wherein the decoder is configured to decode information sent by the transmitter, and wherein the frequency estimation unit is configured to estimate the frequency offset.

14. The receiver according to claim 12, wherein the processor is configured to identify in the received signal at least first and second pilot symbols that carry known respective data values, and to estimate the frequency offset based on both the first and second data symbols and the first and second pilot symbols.

15. The receiver according to claim 12, wherein the processor is configured to identify the first and second data symbols by obtaining the first and second data symbols from corresponding time-frequency resources in the first and second frames.

16. The receiver according to claim 12, wherein the first and second data symbols are each scrambled in the transmitter with a different scrambling sequence, wherein respective data values of the first and second data symbols are the same, and wherein the processor is configured to receive respective post-scrambling versions of the first and second data symbols, and to estimate the frequency offset based on the post-scrambling versions of the first and second data symbols.

17. The receiver according to claim 12, wherein the processor is configured to receive a downlink signal or an uplink signal in accordance with a Long-Term Evolution (LTE) specification.

18. A wireless communication terminal comprising the receiver of claim 12.

19. A chipset for processing signals in a wireless communication terminal, comprising the receiver of claim 12.

20. A chipset for processing signals in a base station, comprising the receiver of claim 12.

\* \* \* \* \*